United States Patent [19]
Torisawa et al.

[11] Patent Number: 5,638,191
[45] Date of Patent: Jun. 10, 1997

[54] IMAGE FORMING APPARATUS

[75] Inventors: Akira Torisawa, Machida; Eihiro Sakaki, Cyofu; Fumihiro Ueno, Yokohama, all of Japan

[73] Assignee: Canon Kabushiki Kaisha, Tokyo, Japan

[21] Appl. No.: 618,088

[22] Filed: Mar. 19, 1996

Related U.S. Application Data

[63] Continuation of Ser. No. 359,861, Dec. 20, 1994, abandoned, which is a continuation of Ser. No. 813,571, Dec. 26, 1991, abandoned.

[30] Foreign Application Priority Data

Jun. 17, 1991 [JP] Japan .................................. 3-144687
Jul. 31, 1991 [JP] Japan .................................. 3-192040

[51] Int. Cl.$^6$ ........................ H04N 1/46; H04N 1/04
[52] U.S. Cl. .................. 358/502; 358/481; 358/490; 358/500; 358/515; 358/296
[58] Field of Search .................... 358/481, 489, 358/490, 493, 494, 496, 498, 298, 500, 505, 515, 530, 532, 502, 296, 300; 355/208, 209, 245; 359/205; H04N 1/46

[56] References Cited

U.S. PATENT DOCUMENTS

| | | | |
|---|---|---|---|
| 4,620,200 | 10/1986 | Fukai | 358/296 |
| 4,647,946 | 3/1987 | Inuyama | 358/296 |
| 4,704,698 | 11/1987 | Reiniger | 358/481 |
| 4,760,251 | 7/1988 | Shimada et al. | 358/481 |
| 4,803,867 | 2/1989 | Murase et al. | 358/481 |
| 4,853,710 | 8/1989 | Shimada et al. . | |
| 4,862,289 | 8/1989 | Shimada | 358/298 |
| 5,081,528 | 1/1992 | Hayashi et al. | 358/530 |
| 5,083,141 | 1/1992 | Taguchi et al. | 346/108 |
| 5,126,756 | 6/1992 | Ban | 358/494 |
| 5,144,339 | 9/1992 | Ohashi et al. | 358/296 |
| 5,148,218 | 9/1992 | Nakane et al. | 355/208 |

FOREIGN PATENT DOCUMENTS 59-38756  3/1984  Japan .
60-76766  1/1985  Japan .

Primary Examiner—Edward L. Coles, Sr.
Assistant Examiner—Madeleine A V Nguyen
Attorney, Agent, or Firm—Fitzpatrick, Cella, Harper & Scinto

[57] ABSTRACT

An image forming apparatus includes a scan unit for scanning a light beam modulated based on an image signal in the main scan direction, and a drive unit for rotating an image carrier in the subscan direction of an image. The rotation period of the image carrier is set to be an integer multiple of the scan period in the main scan direction of the light beam by the scan unit.

24 Claims, 13 Drawing Sheets

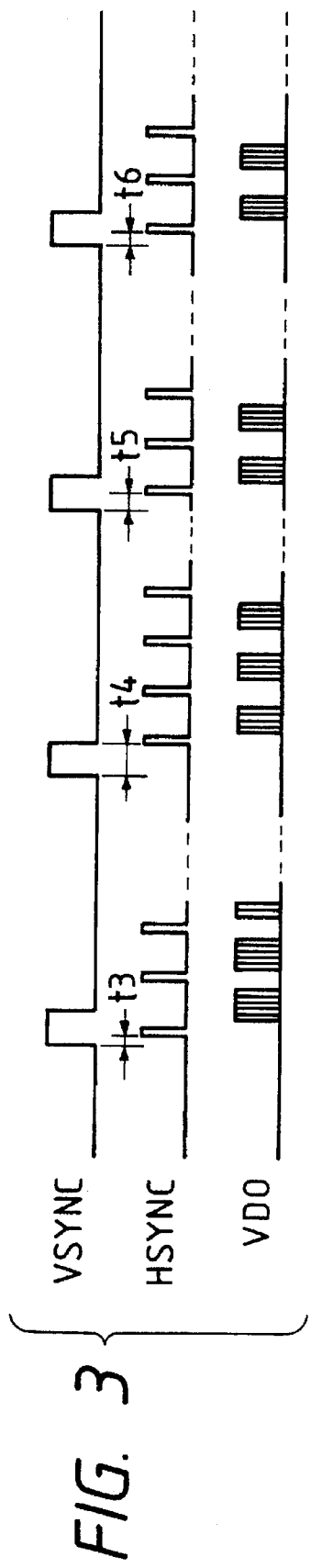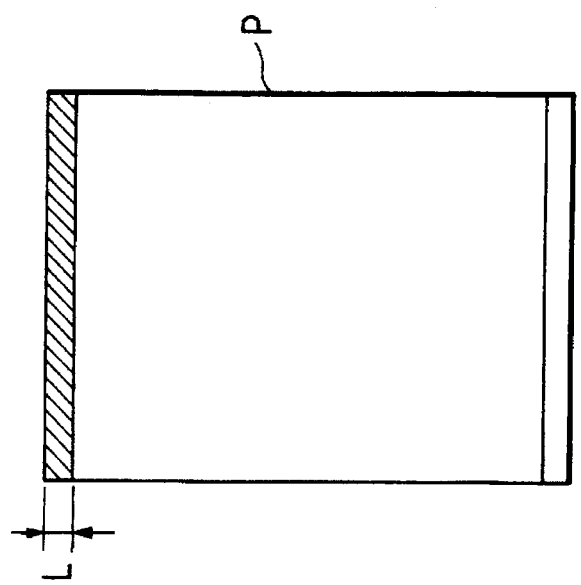

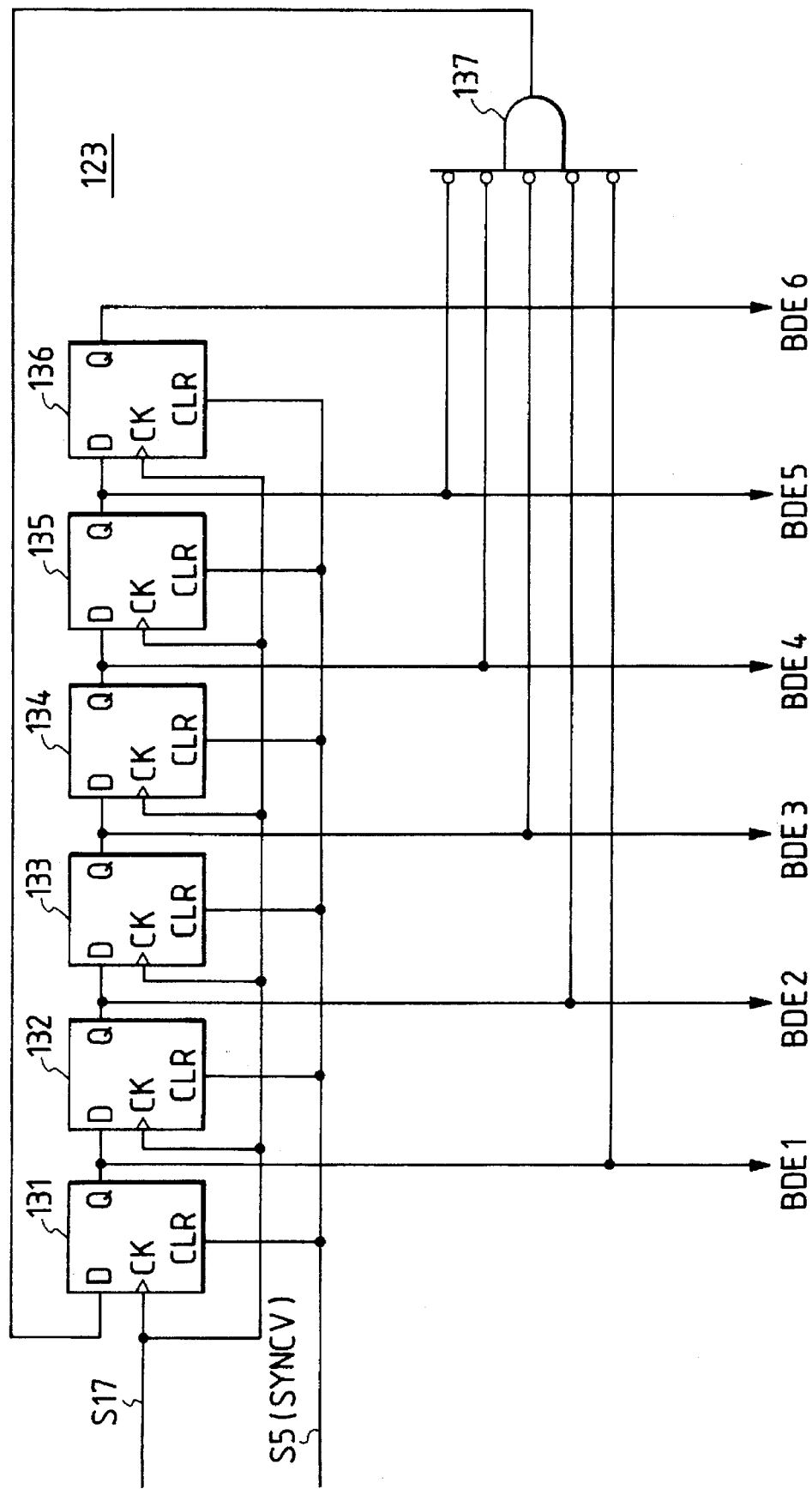

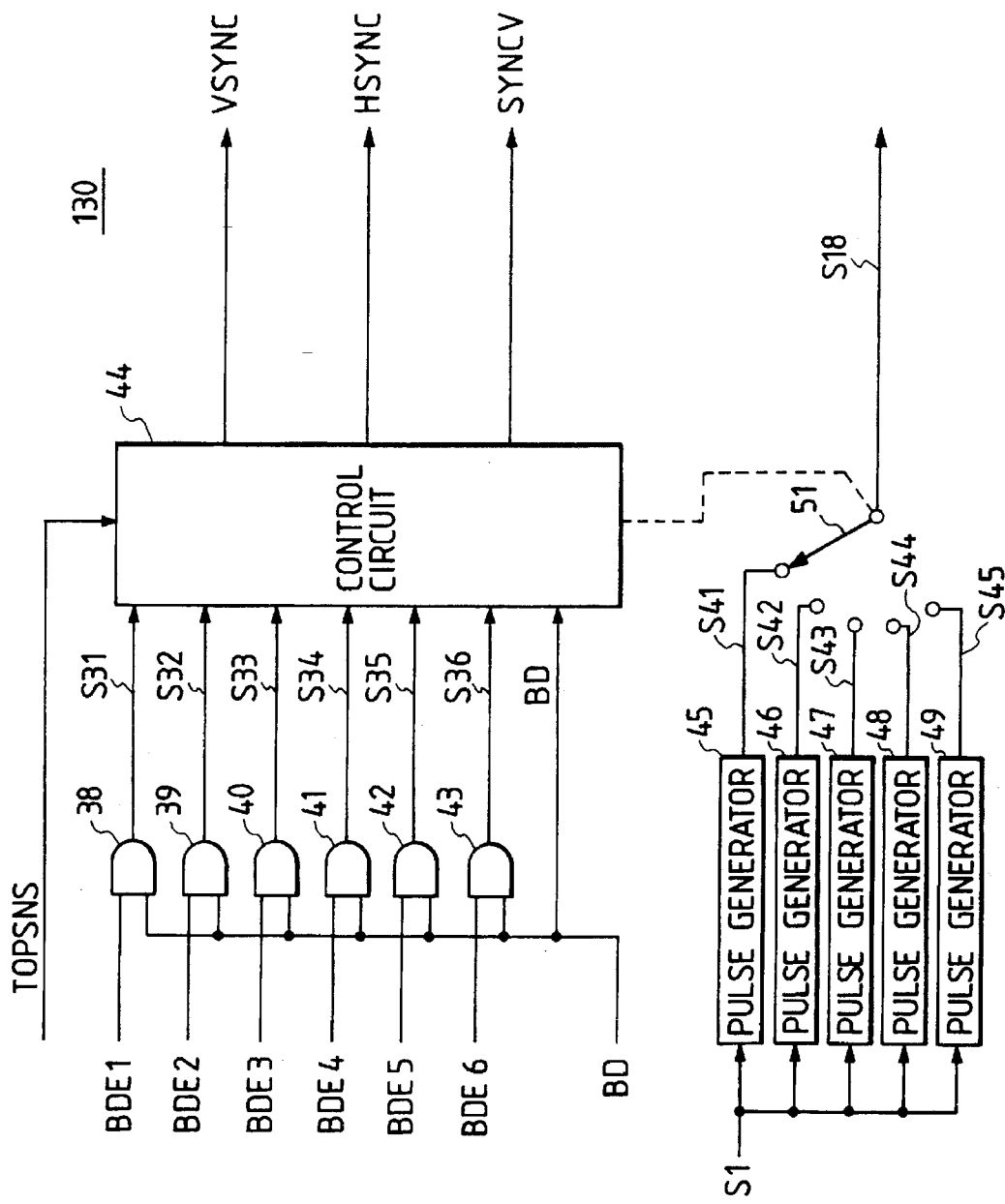

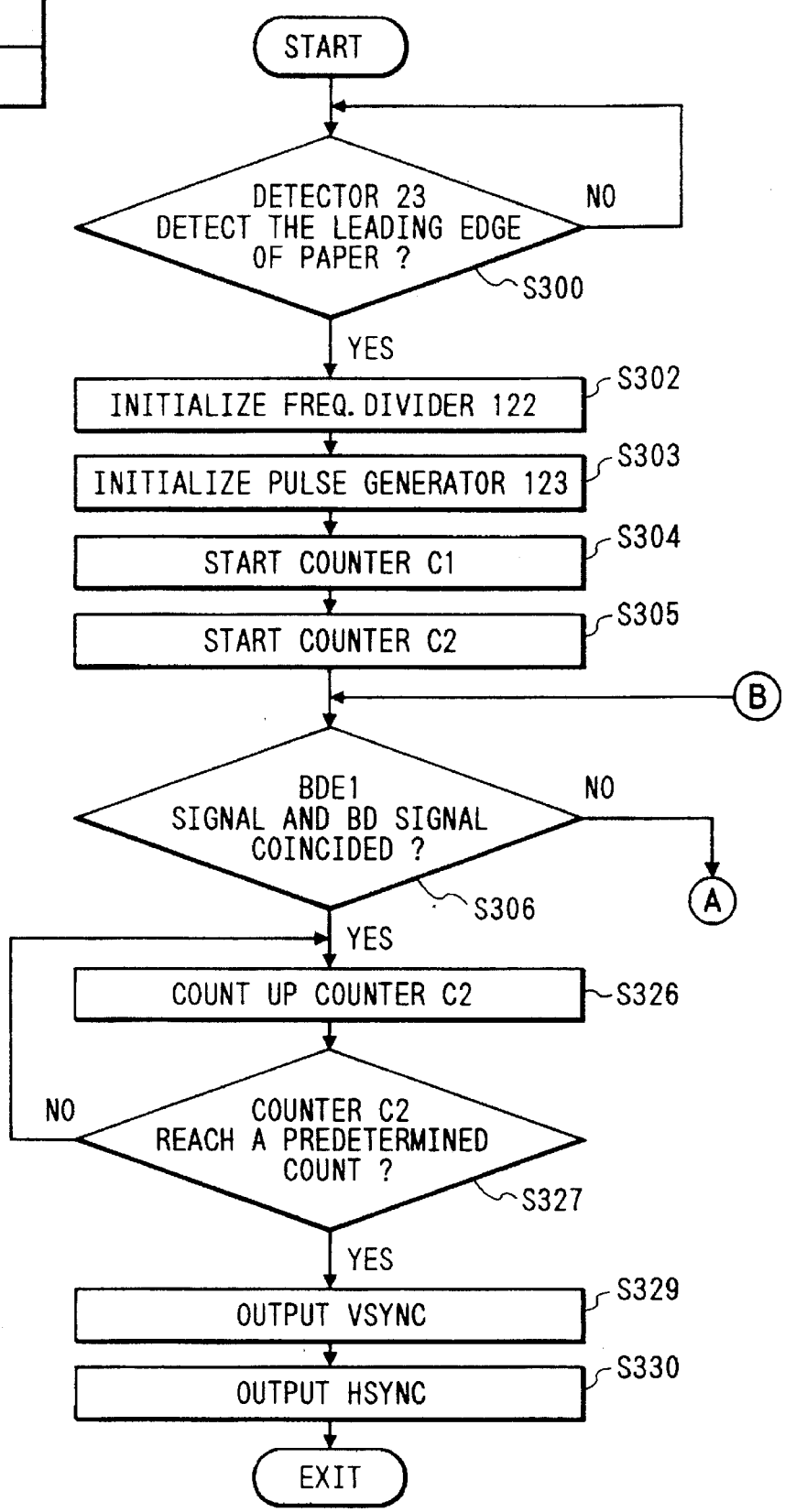

IMAGE FORMING APPARATUS

This application is a continuation of application Ser. No. 08/359,861, filed Dec. 20, 1994, now abandoned, which is a continuation of application Ser. No. 07/813,571, filed Dec. 26, 1991, now abandoned.

BACKGROUND OF THE INVENTION

1. Field of the Invention

The present invention relates to an image forming apparatus, which is applicable to, e.g., a laser beam printer and, more particularly, to a color image forming apparatus for sequentially transferring a plurality of color visible images sequentially formed on an image carrier onto a transfer medium so as to overlap each other.

2. Related Background Art

In recent years, color printers have become available, and are utilized as various expression means for users. In particular, color page printers have received a lot of attention due to their quiet, and high-quality, high-speed printing characteristics.

As the characteristic feature of a color laser beam printer as a kind of color page printers, a process for scanning a light beam on a photosensitive body in the main scanning direction to form a first latent image, performing first development, and thereafter, transferring the first latent image onto a recording medium such as a recording sheet on a transfer carrier, is executed as a first process, and a multi-color image is recorded by subsequently executing second, third, and fourth processes in different colors.

A color printer will be described below with reference to FIGS. 1 and 2.

FIG. 1 is a sectional view of the printer. In FIG. 1, a mechanism section A of the color laser beam printer includes a photosensitive drum 1, a charger 4, a semiconductor laser 5, a scanner motor 6, a polygon mirror 7 rotated by the scanner motor, a lens 8, and a mirror 9. The semiconductor laser 5 outputs a light beam L, which is ON/OFF-modulated according to an image signal S10 (to be referred to as a VDO signal hereinafter).

The light beam emitted from the semiconductor laser 5 is scanned by the polygon mirror 7, and is then guided to the photosensitive drum 1 through the lens 8 and the mirror 9.

A developing unit 3Y develops a latent image formed in the first process so as to form a yellow toner image as a first toner image. A developing unit 3M develops a latent image formed in the second process so as to form a magenta toner image as a second toner image. A developing unit 3C develops a latent image formed in the third process so as to form a cyan toner image as a third toner image. A developing unit 3BK develops a latent image formed in the fourth process so as to form a black toner image as a fourth toner image. A paper cassette 15 stores recording sheets P. The recording sheets P are fed one by one from the cassette by a pickup roller 14.

A transfer drum 16 is constituted by a support member 27 and a film 28. A cleaner 10 removes a non-transferred toner upon completion of each transfer process. The mechanism section A also includes a fixing unit 13, a delivery tray 19, a charger 11, and a peeling pawl 12. A detector 23 detects the leading edge of a sheet on the transfer drum 16, and outputs a vertical sync signal S4. A detector 17 is arranged on the scanning axis of the light beam, and outputs a beam detect signal (to be referred to as a BD signal hereinafter) S6 serving as a horizontal sync signal upon incidence of the light beam L.

The operation of this arrangement will be described below. The photosensitive drum 1 is primarily electrified in a predetermined polarity at a predetermined voltage by the charger 4. When the leading edge of the sheet is detected by the sheet leading edge detector 23, the light beam L modulated by the VDO signal S10 scans and exposes the photosensitive drum 1 in synchronism with the BD signal S6, thereby forming a first electrostatic latent image. The first electrostatic latent image is developed by the developing unit 3Y, thus forming a yellow first toner image on the photosensitive drum 1.

On the other hand, the recording sheet P is fed at a predetermined timing. Immediately before the leading edge of the sheet reaches a transfer start position, a predetermined transfer bias voltage in a polarity opposite to that of the toner is applied to the transfer drum 16, so that the recording sheet P is electrostatically attracted on the surface of the transfer drum 16, and the first toner image transferred onto the recording sheet P.

A second electrostatic latent image is formed on the photosensitive drum by the light beam L, and thereafter, is developed by the developing unit 3M, thereby forming a magenta toner image on the photosensitive drum 1. The second toner image is transferred onto the recording sheet P at a position of the first toner image previously transferred onto the recording sheet P in synchronism with the recording sheet. Similarly, third and fourth electrostatic latent images are formed on the photosensitive drum 1, and cyan and black toner images are transferred in synchronism with the recording sheet P, thus forming toner images of four colors on the recording sheet P. In this manner, the VDO signals S10 for one page are sequentially output to the semiconductor laser 5 in each process.

When the leading edge of the recording sheet P, on which the toner images of four colors have been transferred, approaches the peeling pawl, the peeling pawl 12 is moved close to the transfer drum 16, so that its distal end is brought into contact with the surface of the transfer drum 16, thereby peeling the recording sheet P from the transfer drum 16. The distal end of the peeling pawl 12 is kept in contact with the surface of the transfer drum 16 until the trailing edge of the recording sheet P is peeled from the transfer drum 16. Thereafter, the peeling pawl 12 is returned to its home position. The charger 11 discharges an electrified charge on the recording sheet P to facilitate peeling of the recording sheet P by the peeling pawl 12, and to eliminate air discharge upon peeling.

FIG. 2 is a block diagram of a laser beam scanning apparatus in a controller of the above-mentioned printer.

The same reference numerals in FIG. 2 denote elements having the same states as in FIG. 1. The image forming operation of the printer apparatus will be described below with reference to FIG. 2.

The scanning apparatus shown in FIG. 2 includes a reference oscillator 20, a frequency divider 21 for frequency-dividing a reference clock S1 output from the reference oscillator with a predetermined value, and a motor control circuit 25 for controlling uniform rotation of the scanner motor 6 to follow a frequency-divided clock S2 output from the frequency divider 21.

The motor control circuit 25 incorporates a known phase control circuit (not shown), and rotates the scanner motor 6 at a constant speed, so that a phase difference between a feedback signal S7 from the scanner motor 6 and the frequency-divided clock S2 is equal to a predetermined phase difference. The photosensitive drum 1 and the transfer drum 16 are rotated at a constant speed by a drive motor 30. The leading edge of the recording sheet P on the transfer drum 16 is detected by the detector 23, and the detector 23 outputs a vertical sync signal (to be referred to as a VSYNC signal hereinafter) S4 to an image generator 29. The leading edge of an image of each color is regulated by the VSYNC signal S4. The VD0 signals S10 are sequentially sent to the laser 5 in synchronism with BD signals S6 after the VSYNC signal S4.

However, in the above-mentioned technique, toner images of four colors are respectively developed and formed on an image carrier in units of colors, and are caused to overlap each other on a transfer carrier, thereby forming a multi-color toner image. For this reason, an HSYNC signal is shifted from the VSYNC signal (t3 to t6), as shown in FIG. 3, and a finally fixed color image on a recording sheet suffers from color misregistration in units of color components, as shown in FIG. 4.

As a method of preventing the color misregistration, rotational control precision of drive systems such as a scanning optical system, a photosensitive/transfer drum system, and the like must be individually improved. However, when the scanner motor comprises a high-precision motor using an air bearing, and the transfer drum employs a flywheel, this results in an increase in size of the printer, and an increase in manufacturing cost. Even when rotational precision is improved, the image start position of the first color cannot often coincide with those of the second and third colors due to the relationship between rotational speeds of the scanning optical system and the photosensitive/transfer drum system.

For example, when a printing operation is performed at a density of 400 dpi, if the transfer drum has an outer diameter of 120 mm, 5936.868 (=120×π÷(25.4÷400)) lines can be drawn on the outer circumferential surface of the drum. When an image of the second color is printed, misregistration of 0.868 lines, i.e., 0.868×(25.4÷400)=55.1 µm, occurs at the beginning of the image. Since an image of the third color is further shifted by 55.1 µm, it is shifted from the image of the first color by 110.2 µm. Since an allowable limit of color misregistration is about 20 µm in a visual sense, the color misregistration is conspicuous in the above-mentioned case.

SUMMARY OF THE INVENTION

It is an object of the present invention to solve the above-mentioned technical problems.

It is another object of the present invention to improve a color printer.

It is still another object of the present invention to provide a color image forming apparatus capable of forming a high-quality image.

It is still another object of the present invention to provide an image forming apparatus free from color misregistration.

It is still another object of the present invention to provide an image forming apparatus, which can attain high-precision registration.

Other objects, features, and effects of the present invention will become further apparent from the following detailed description, accompanying drawings, and appended claims.

BRIEF DESCRIPTION OF THE DRAWINGS

FIG. 3 is a timing chart of signals of the conventional color laser printer;

FIG. 4 is a view for explaining color misregistration in the conventional color laser printer;

FIG. 6 is a block diagram showing a pulse generator 23 according to the first embodiment of the present invention;

FIG. 7 is a block diagram showing a controller 30 according to the first embodiment of the present invention;

DETAILED DESCRIPTION OF THE PREFERRED EMBODIMENTS

The preferred embodiments of the present invention will be described below with reference to the accompanying drawings.

First Embodiment

Figure 5:
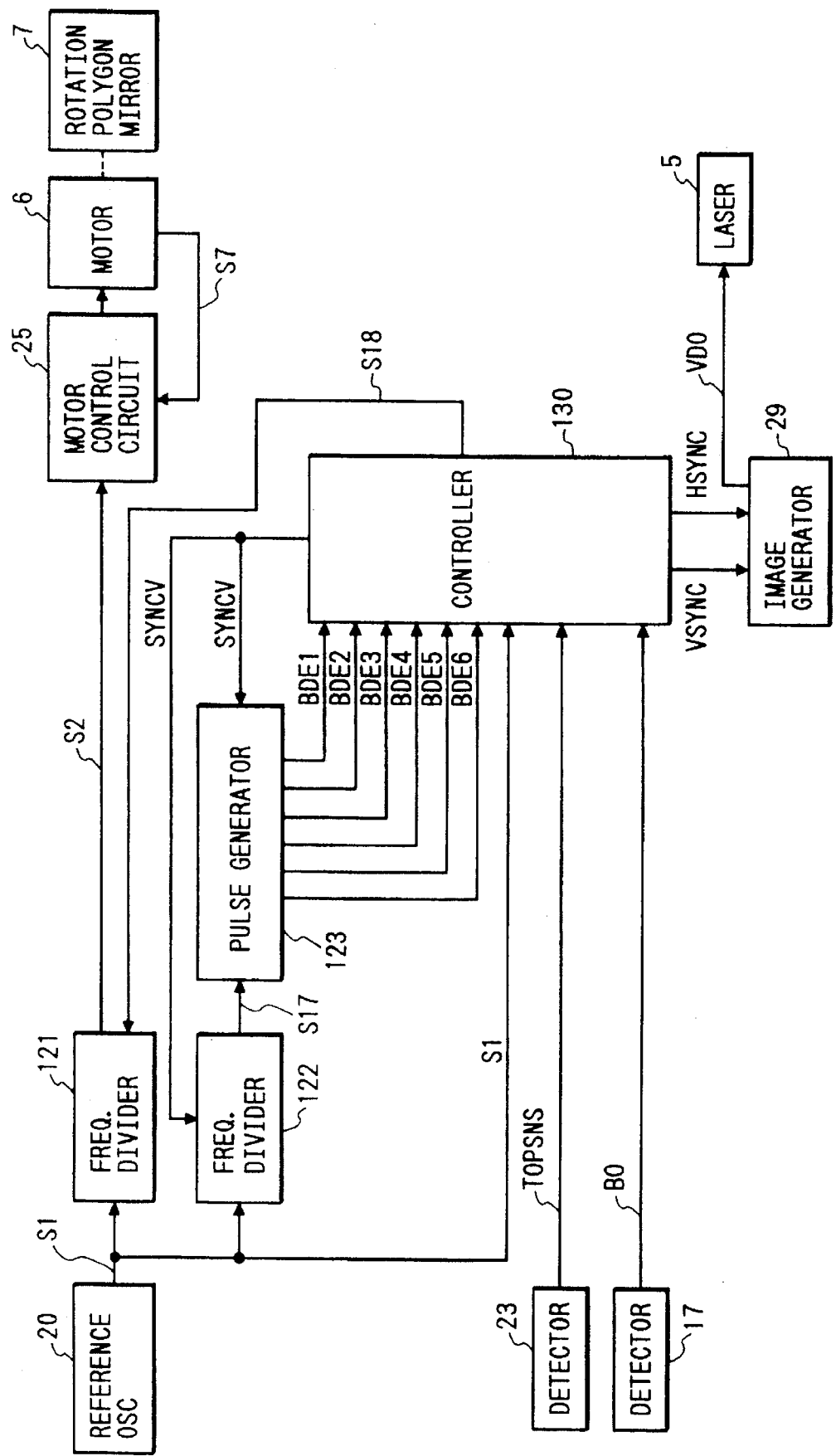
FIG. 5 is a block diagram showing an electrical arrangement according to the first embodiment of the present invention.

FIG. 5 shows the first embodiment of the present invention. This embodiment exemplifies a color light beam printer.

Figure 1:
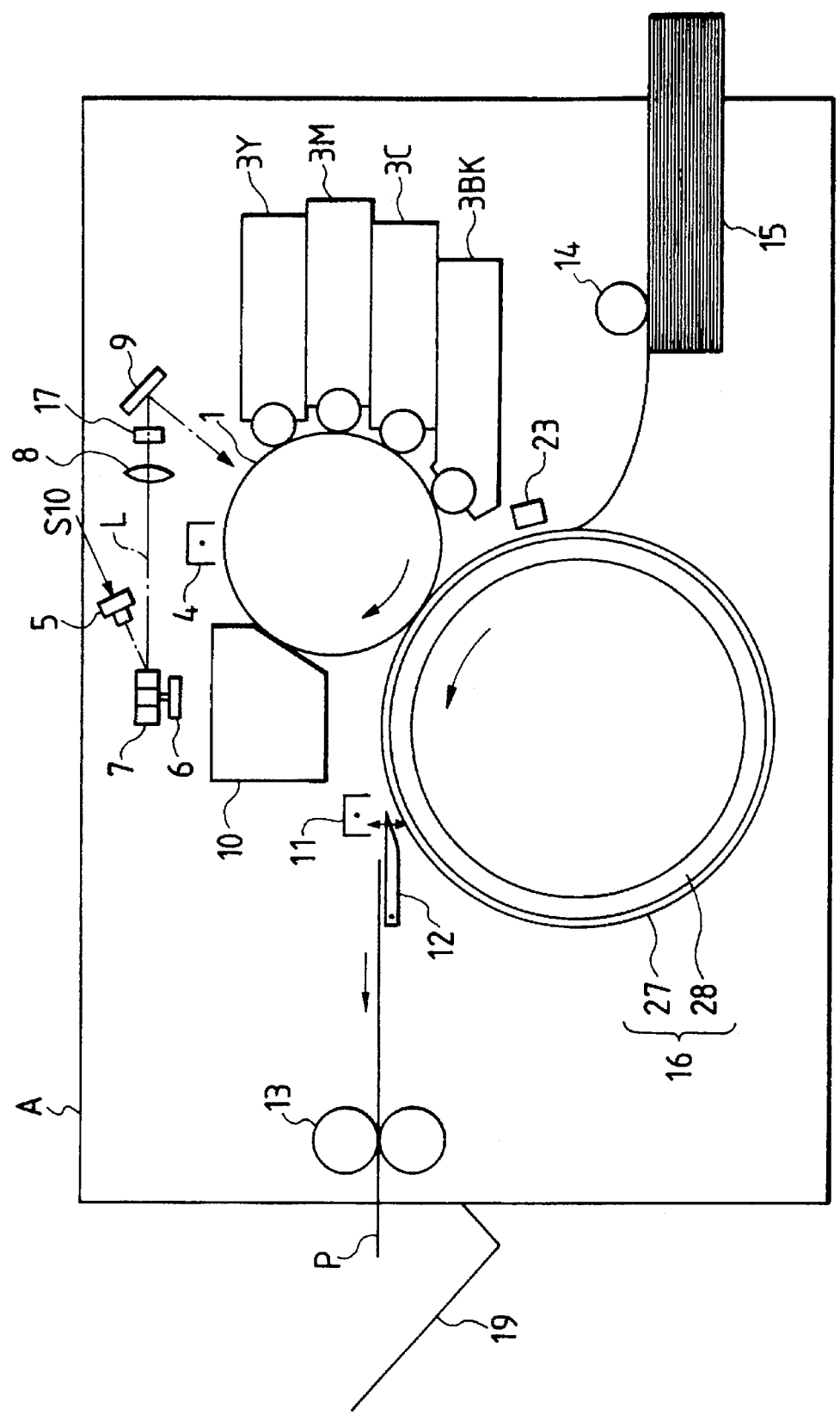
FIG. 1 is a sectional view of a conventional color laser printer.

Note that the mechanical arrangement of this printer is the same as that shown in FIG. 1, and a detailed description thereof will be omitted.

Figure 2:
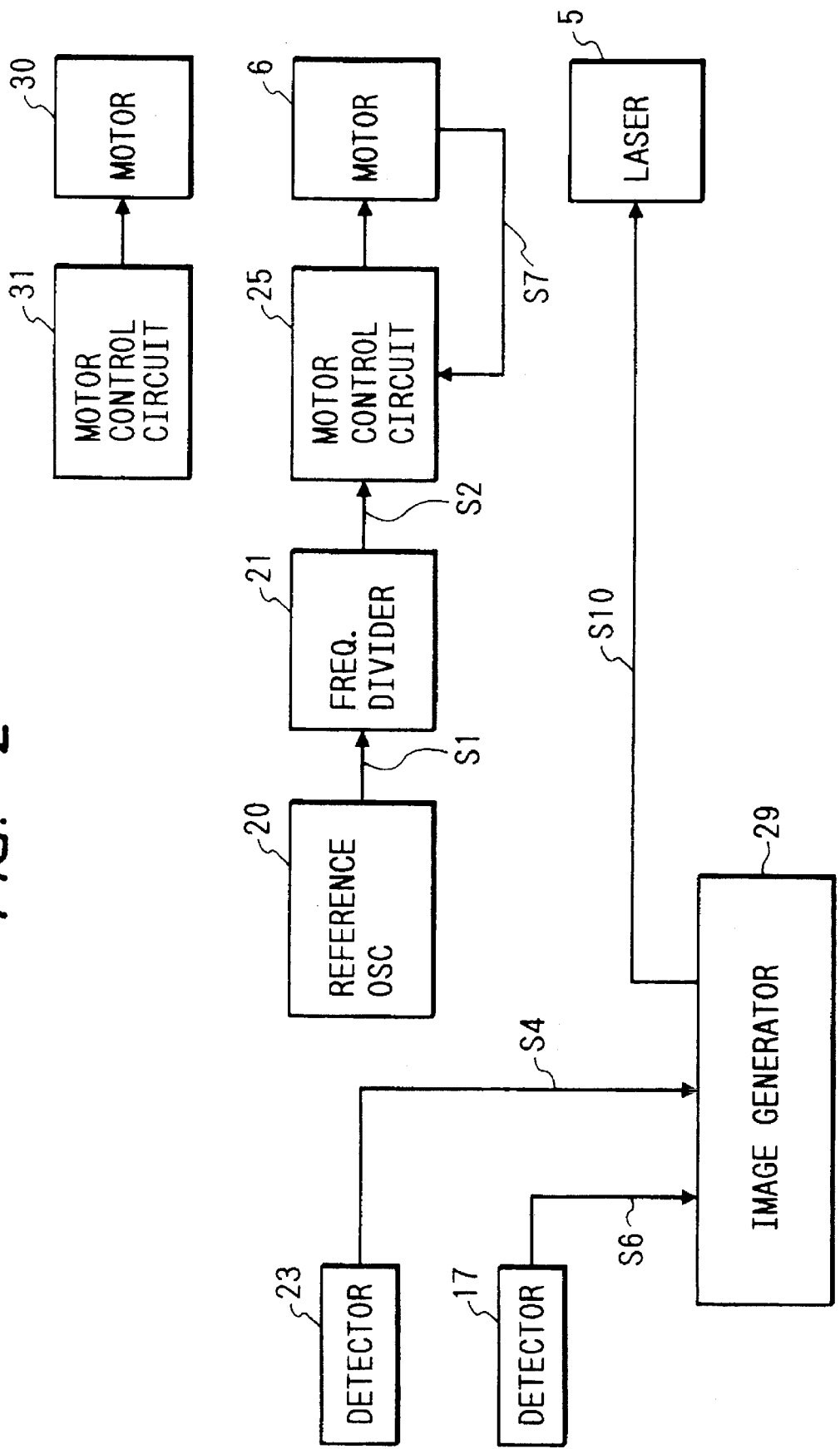
FIG. 2 is a block diagram showing an electrical arrangement of the conventional color laser printer.

In FIG. 5, components 5 to 7, 17, 20, 23, 25, and 29 are the same as those shown in FIG. 2. A frequency divider 121 frequency-divides a clock signal (signal S1) from a reference oscillator 20 to generate a motor clock signal S2. A frequency divider 122 frequency-divides the clock signal (signal S1) from the reference oscillator 20 to generate a signal S17. A pulse generator 123 has an arrangement as shown in FIG. 6 (to be described later), and generates BDE1 to BDE6 signals whose phases are respectively different from that of the signal S17. A controller 130 has an arrangement as shown in FIG. 7 (to be described later). Upon reception of a BD signal from a detector 17, the controller 130 outputs an HSYNC signal. Upon reception of a TOP-SNS signal from a detector 23, the controller 130 outputs a VSYNC signal, and outputs a clear signal (SYNCV signal) to the frequency divider 122 and the pulse generator 123 to clear them. In addition, the controller 130 outputs a signal S18 to the frequency divider 121 to perform ON/OFF control. An image generator 29 outputs a VDO signal on the basis of the VSYNC signal and the HSYNC signal from the controller 130.

FIG. 6 shows the arrangement of the pulse generator 123 shown in FIG. 5.

D-latches 131 to 136 receive the signal S17 from the reference oscillator 20 at their CK terminals, and output the BDE1 to BDE6 signals from their Q terminals. Of the BDE1 to BDE6 signals, the BDE1 to BDE5 signals are input to the D terminals of the next D-latches. The BDE1 to BDE5 signals from the Q terminals of the D-latches 131 to 135 are input to an input-negative AND gate 137. A signal from the AND gate 137 is input to the D terminal of the D-latch 131.

FIG. 7 shows the arrangement of the controller 130 shown in FIG. 5.

AND gates 38 to 43 logically AND the BDE1 to BDE6 signals from the pulse generator 123 (FIG. 5) and the BD signal from the detector 17 (FIG. 5), thus outputting signals S31 to S36. When one of the signals S31 to S36 is input to a control circuit 44, one of signals S41 to S45 (FIG. 8) from pulse generators 45 to 49 is selected by a selection switch 51 according to the input signal, and the selected signal is output to the frequency divider 121 as a signal S18. When the TOPSNS signal is input from the detector 23, the VSYNC signal is output to the image generator 129 (FIG. 5), and the clear signal (signal SYNC) is output to the pulse generator 123 (FIG. 5), and the frequency divider 122 (FIG. 5), thereby initializing the generator 123 and the divider 122. As a result, signals BDE1 to BDE6 from the pulse generator 123 are synchronized with the VSYNC signal.

Figure 9:
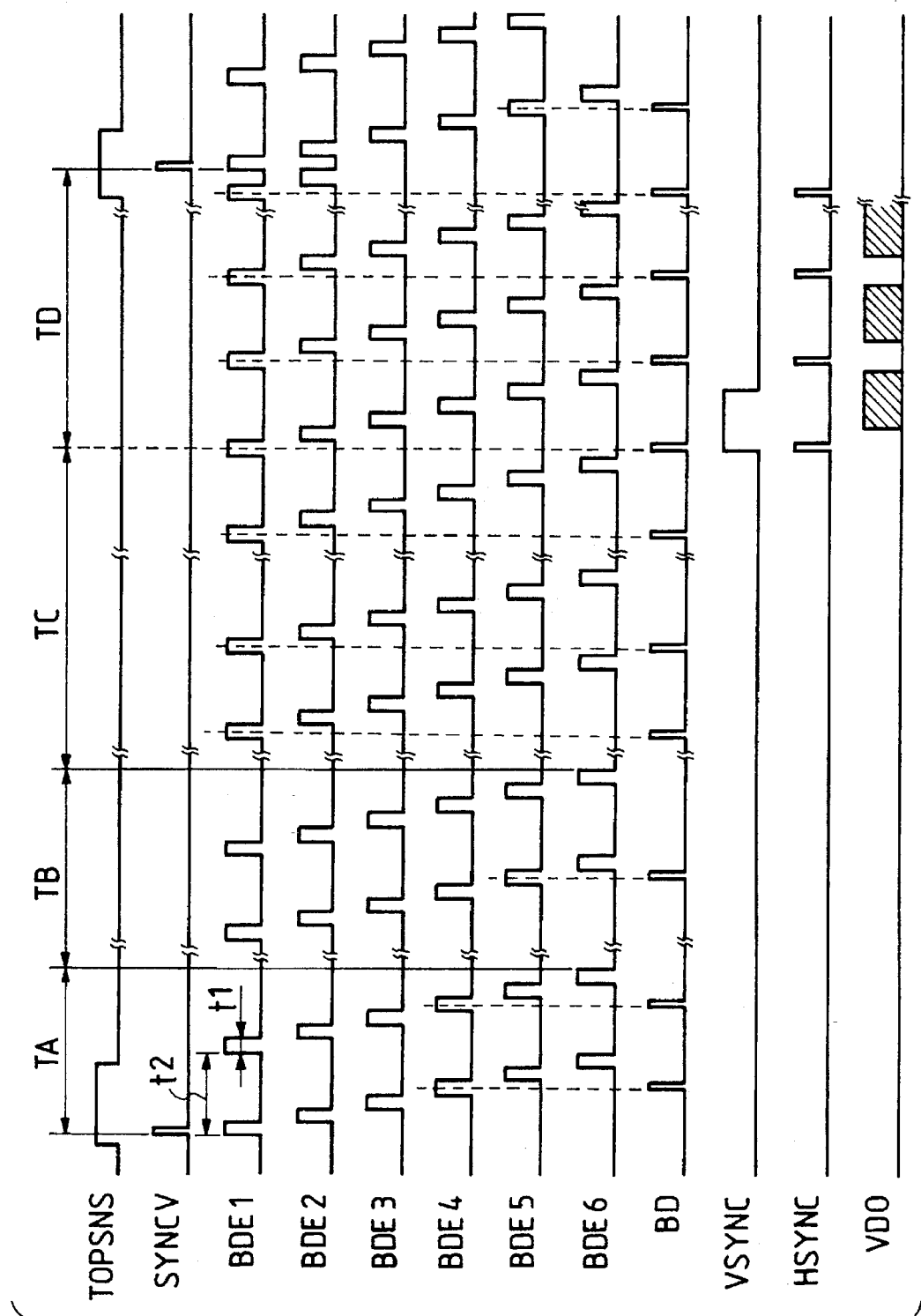
FIG. 9 is a timing chart showing an operation of the first embodiment.

A control operation by the controller 130 will be described below with reference to the timing chart shown in FIG. 9.

Figure 8:
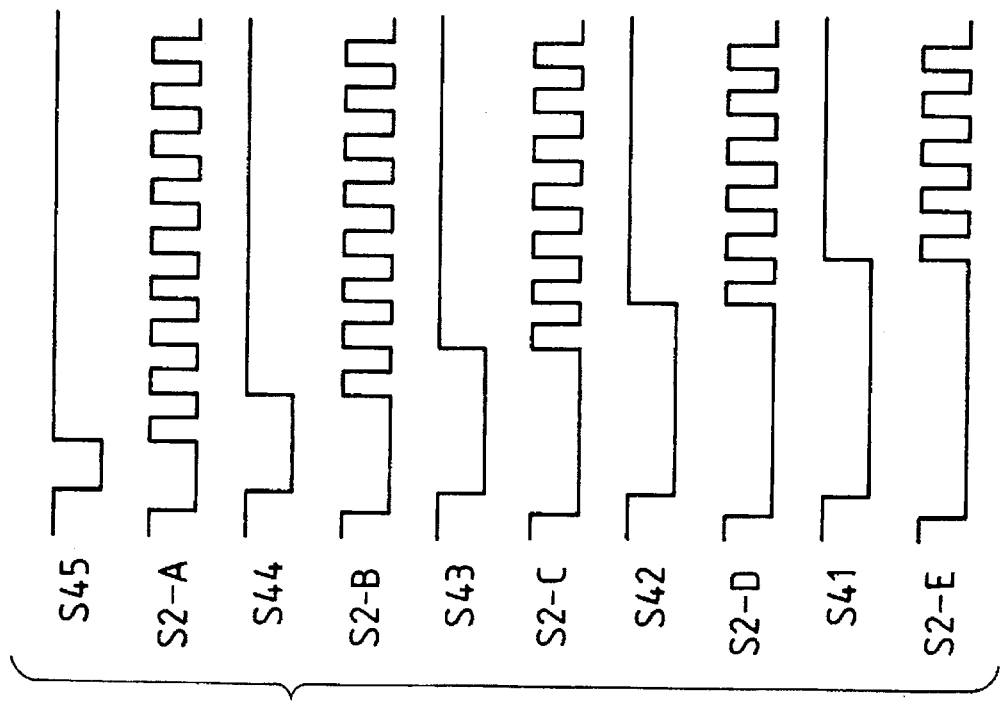
FIG. 8 is a timing chart showing an operation of the controller 30.

For example, when the BD signal from the detector 17 coincides with the BDE4 signal during a period TA, one of the BDE1 to BDE6 signals from the pulse generator 123 is output as a signal S18 from the controller 130 to the frequency divider 121 which in this time period TA outputs motor clock signal S2-A (FIG. 8). The number of pulses from a motor control circuit 25 is changed, and as a result, the rotational speed of a motor 6 for driving a rotation polygon mirror 7 is changed. As a result, after an elapse of a predetermined period of time, the position of the BD signal is moved to a position where the BD signal coincides with the BDE5 signal like in, e.g., a period TB.

Thereafter, the rotational speed of the rotation polygon mirror 7 is controlled until the BD signal coincides with the BDE1 signal (see a period TC). The VSYNC signal delayed by the TOPSNS signal is output to the image generator 129, and at the same time, the HSYNC signal begins to be supplied. Furthermore, the VDO signal is output to a laser 5 in synchronism with the HSYNC signal. A time interval from the period TA to the period TC is constant for each color. During a period TD, image data for the first color are sequentially output from the image generator 129 in synchronism with the HSYNC signal.

Thereafter, the above-mentioned control operation is performed respectively when images of the second, third, and fourth colors begin to be output. In each case, frequency divider 121 outputs motor clock signal S2-A, S2-B, S2-C, S2-D or S2-E (FIG. 8), as appropriate.

Figure 10B:
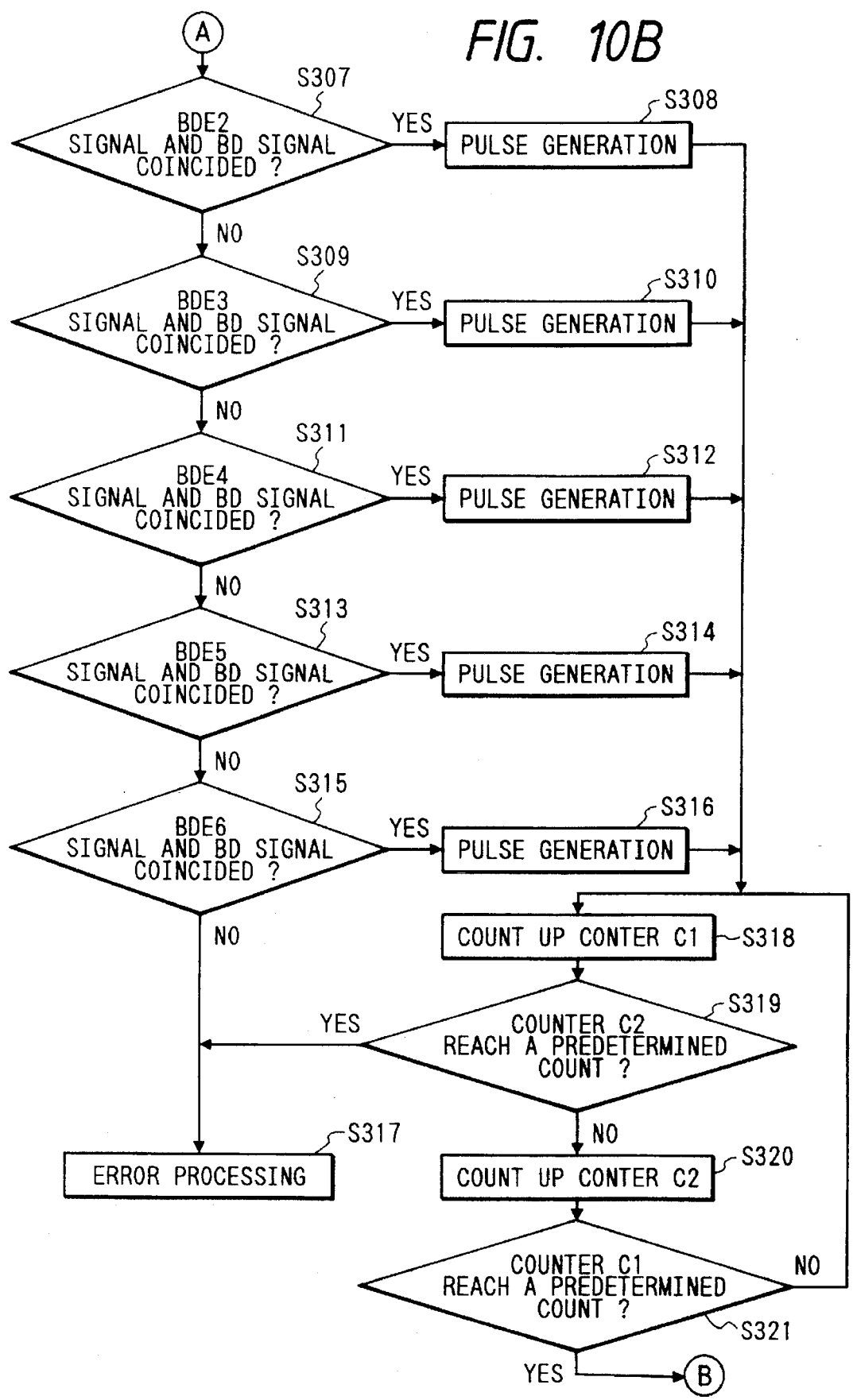
FIG. 10 is a flow chart for explaining an operation of the first embodiment.

FIG. 10 is a flow chart showing a control sequence by the controller 130.

When a transfer drum 16, which attracts a recording sheet (paper) P, is rotated at a predetermined timing, and the leading edge of the recording sheet P is detected by the detector 23, the TOPSNS signal is output as the VSYNC signal. The VSYNC signal is input to the controller 130, and the following control is made until a printing operation is completed. A counter C1 checks if the BD signal coincides with one of the BDE1 to BDE6 signals, and defines a time until the rotational speed of the motor 6 is changed, and is stabilized. A counter C2 includes the count value of the counter C1, and defines the number of times of coincidences and incoincidences between the BD signal and the BDE1 to BDE6 signals. Note that the counters C1 and C2 are software counters defined by a program in the control circuit 44.

When the VSYNC signal is input in step S300, the frequency divider 122 is initialized in step S302, and the pulse generator 123 is initialized in step S303. In step S304, the counter C1 is started, and in step S305, the counter C2 is started.

It is checked in step S306 if the BD signal coincides with the BDE1 signal. If YES in step S306, the counter C2 is counted up until its count value reaches a predetermined value in steps S326 and S327. In step S329, the VSYNC signal is output. In step S330, the HSYNC signal is output, thus ending control.

On the other hand, if it is determined in step S306 that the BD signal does not coincide with the BDE1 signal, the flow advances to step S307, S309, S311, S313, or S315.

More specifically, if it is determined in step S307, S309, S311, S313, or S315 that the BD signal coincides with one of the BDE2, BDE3, BDE4, BDE5, and BDE6 signals, the predetermined pulse S18 is output to the frequency divider 121 in step S308, S310, S312, S314, or S316, thereby stopping the frequency divider 121. In step S318, the counter C1 is counted up, and in step S319, it is checked if the count value of the counter C2 has reached a predetermined value. If YES in step S319, error processing is executed in step S317. On the other hand, if NO in step S319, the counter C3 is counted up in step S320, and it is checked in step S321 if the count value of the counter C1 has reached a predetermined value. If NO in step S321, the flow returns to step S318; otherwise, the flow returns to step S306.

Second Embodiment

Figure 11:
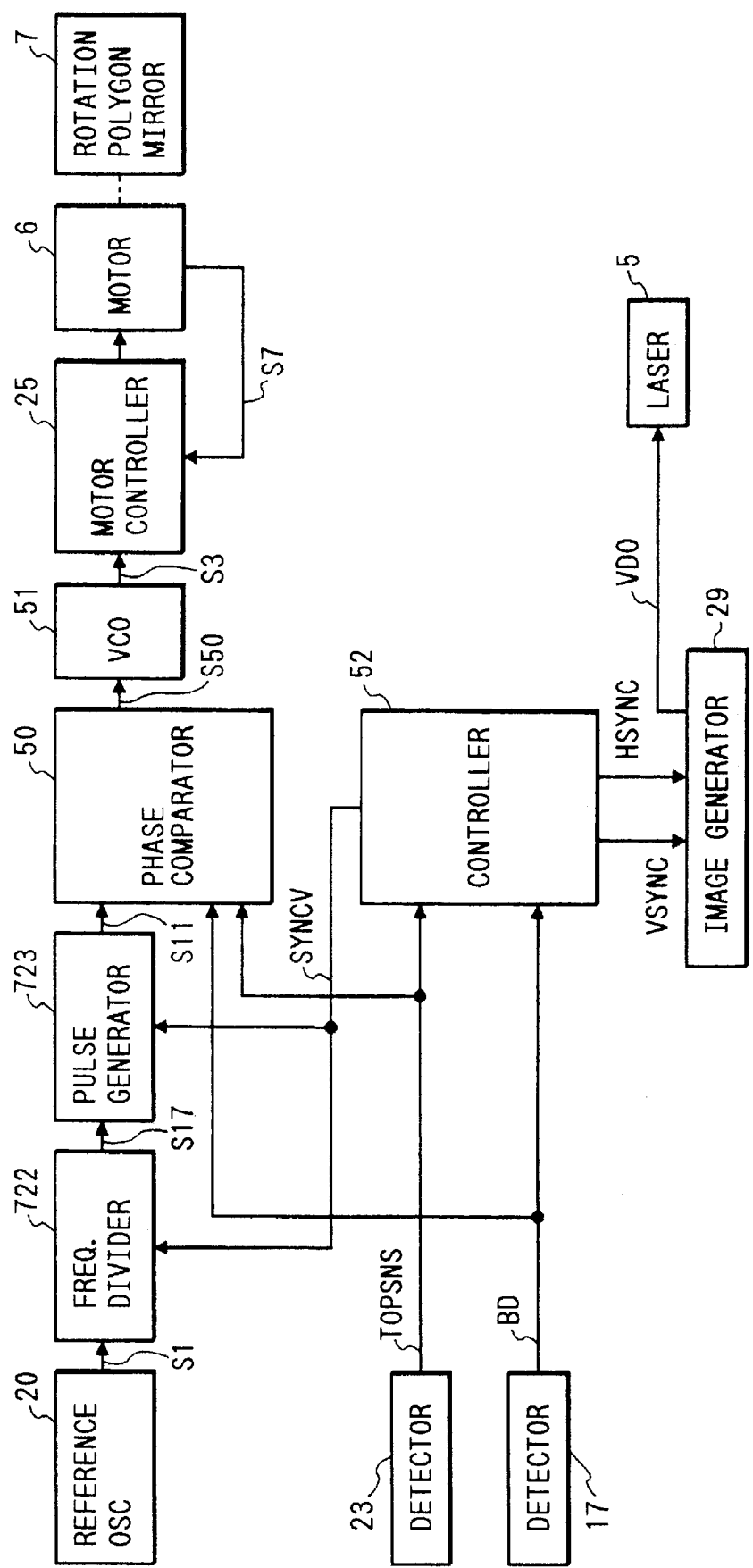
FIG. 11 is a block diagram showing an electrical arrangement according to the second embodiment of the present invention.

FIG. 11 shows the second embodiment of the present invention.

A frequency divider 722 frequency divides a clock signal (signal S1) from a reference oscillator 20. A pulse generator 723 generates a signal S11 on the basis of a signal S17 from the frequency divider 722. A phase comparator 50 compares a BD signal from a detector 17 and the signal S11 from the pulse generator 723 for a predetermined period of time after the TOPSNS signal is input from a detector 23. AVCO (voltage-controlled oscillator) 51 generates a signal S3 on the basis of a signal S50 according to a phase difference from the phase comparator 50. A controller 52 outputs a VSYNC signal, and an SYNCV signal to the frequency divider 722 and the pulse generator 723 when the TOPSNS signal is input from the detector 23. The controller 52 outputs an HSYNC signal when a BD signal is input from the detector 17. An image generator 29 generates a VDO signal on the basis of the VSYNC signal and the HSYNC signal from the controller 52.

Upon comparison with the first embodiment, this embodiment has a different arrangement of a motor control means. More specifically, in the first embodiment, the motor 6 for driving the rotation polygon mirror 7 is controlled by the motor control circuit 25 according to an ON/OFF operation of the frequency divider 121. However, in this embodiment, the motor 6 is controlled by a motor controller 25 based on the signal S3 from the VCO 51. With this arrangement, images can be registered with high precision in units of color components, and an image free from color misregistration can be formed like in the first embodiment.

Third Embodiment

Figure 12:
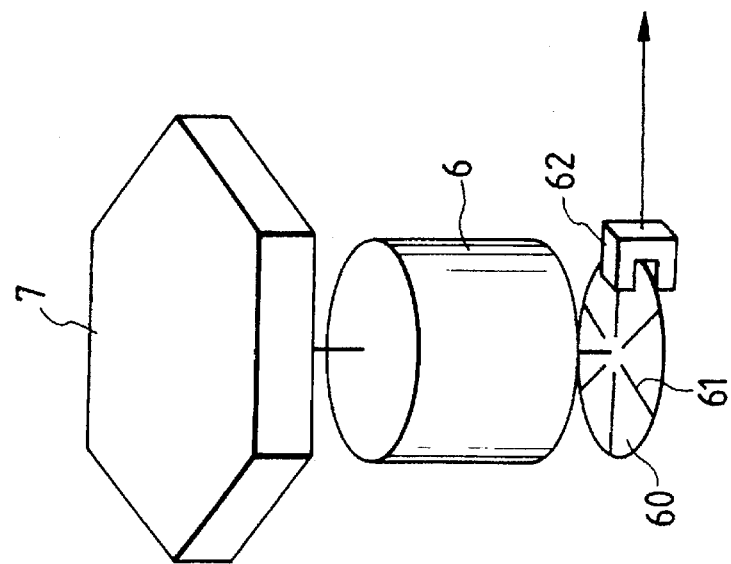
FIG. 12 is a perspective view showing an arrangement of principal part according to the third embodiment of the present invention.

FIG. 12 shows a scanning optical system according to the third embodiment of the present invention.

Upon comparison with the first embodiment, this embodiment has a different arrangement of an optical scanning device. In this embodiment, an encoder prepared by drawing slits 61 paired with a rotation polygon mirror 7 on a transparent disc 60 with an opaque paint is coaxially attached to a motor 6. The slits 61 are detected by a transmission type photosensor 62, thereby outputting pulse signals. When the slits 61 are drawn on the encoder (transparent disc) 60 at equal angular intervals in correspondence with the number of surfaces of the rotation polygon mirror 7, a pulse signal from the photosensor 62 corresponding to each slit serves as information indicating the rotational position of the rotation polygon mirror 7. Therefore, the pulse signal can be utilized as a signal equivalent to the BD signal in the first and second embodiments.

Fourth Embodiment

Figure 13A:
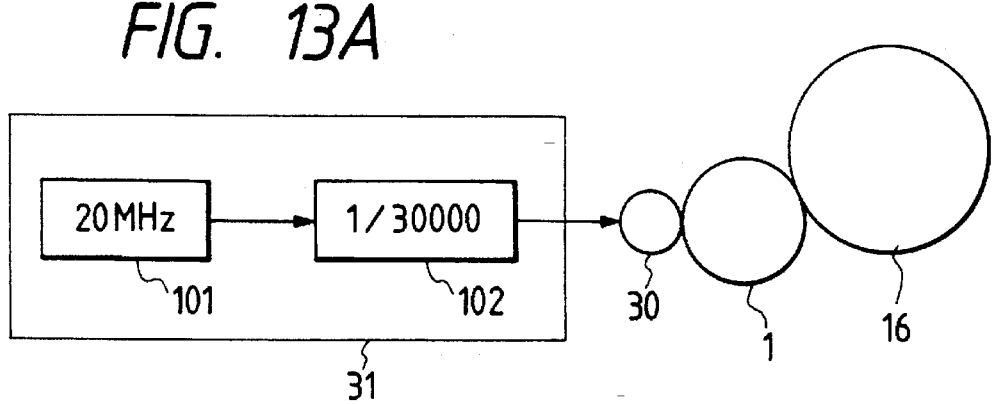
FIGS. 13A and 13B are diagrams showing an arrangement of principal part according to the fourth embodiment of the present invention.
Figure 13B:
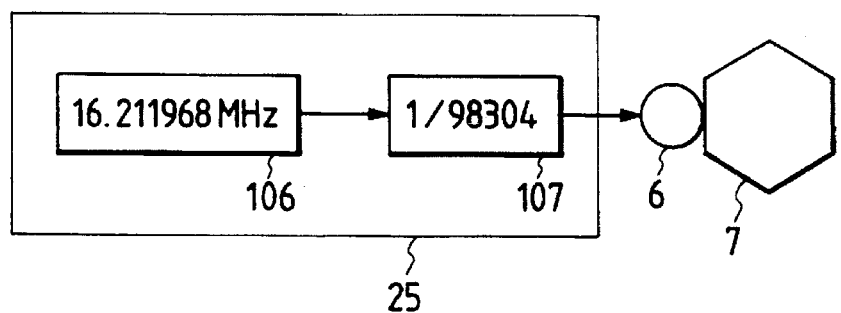

The fourth embodiment of the present invention will be described below with reference to FIGS. 13A and 13B.

Note that the mechanical arrangement of the fourth embodiment is the same as that shown in FIG. 1, and a detailed description thereof will be omitted.

In this embodiment, a motor 30 adopts a stepping motor, and is driven by a pulse signal from a motor controller 31. An oscillator 101 has a 20-MHz quartz vibrator for supplying a reference signal for driving a photosensitive drum 1 and a transfer drum 16. A frequency divider 102 frequency-divides a signal from the oscillator 101 to 1/30,000. The pulse motor 30 is rotated by the signal (e.g., 200 pulses per revolution in this embodiment) from the frequency divider 102. The photosensitive drum 1 is rotated while decelerating the rotation of the pulse motor to 1/10 by gears, and the transfer drum 16 is rotated while decelerating the rotation of the photosensitive drum 1 to ½. An oscillator 106 has a 16.211968-MHz quartz vibrator for supplying a reference signal for driving a scanner motor 6. A frequency divider 107 frequency-divides the signal from the oscillator 106 to 1/98,256. The scanner motor 6 rotates a polygon mirror 7 having six mirror surfaces.

Note that a printer of this embodiment performs printing at a density of 400 dpi.

In the above arrangement, a 20-MHz signal from the oscillator 101 is frequency-divided by the frequency divider 102 to 1/30,000, i.e., to 666.666667 kHz. The stepping motor 30 completes 3.33333333 revolutions per second by this signal since it completes one revolution by 200 pulses. In this embodiment, the photosensitive drum is decelerated by gears (not shown) to 1/10, i.e., completes a 0.333333333 revolution per second, and furthermore, the transfer drum is decelerated to ½, i.e., completes a 0.1666666667 revolution per second. In other words, the transfer drum is rotated at 10 rpm.

As described above, the printer of this embodiment performs printing at a density of 400 dpi, and the outer diameter of the transfer drum of this embodiment is 120 mm. Therefore, when lines are drawn on the outer circumferential surface of the transfer drum at a density of 400 dpi, 5936.868 (120×π÷25.4×400) lines can be drawn. In this state, since a shift of a 0.868 line is formed upon completion of one revolution of the transfer drum, 5937 lines defined by rounding up 5936.868 to the ones place are set to be formed on the outer circumferential surface of the transfer drum in this embodiment. This value corresponds to a pitch of 63.4986 µm, and to 400.0088931 dpi in dpi indication. This value is substantially equal to 400 dpi. When 5936.868 are rounded up at the tens place, 5940 lines can be drawn. This value corresponds to a pitch of 63.4665 µm, and to 400.211 dpi. This value includes an error of 0.0528%, i.e., a sufficiently allowable error. In this embodiment, a case will be described below wherein 5936.868 are rounded up to the ones place.

A 16.211968-MHz signal from the oscillator 106 is frequency-divided by the frequency divider to 1/98,304 to be converted to a 164.9972317-Hz signal. The converted signal controls the rotation of the scanner motor comprising a brushless DC motor. Therefore, the scanner motor of this embodiment is rotated at 9,895 rpm. Since the period of one revolution of the scanner motor is 6.063668 msec, and the polygon mirror has six mirror surfaces, a period per laser scan is 1.010611 msec. When the outer circumferential surface of the transfer drum is scanned at this period, lines can be drawn at a pitch of 63.4986 µm (=120×π÷6× $1.010611×10^{-3}$). This pitch corresponds to 400.00881 dpi (=25.4 mm÷63.4986 µm).

More specifically, in this embodiment, since the revolution period of 6 sec of the transfer drum is 5,937 times a laser scan period of 1.010611 msec, 5937 lines can be formed at equal intervals on the outer circumferential surface of the transfer drum. Thus, registration of yellow image formation in the first process, magenta image formation in the second process, cyan image formation in the third process, and black image formation in the fourth process in the above-mentioned color image formation can be accurately controlled, and quality of a multi-color image formed by overlapping color images can be improved.

Fifth Embodiment

In the above embodiment, reference oscillators are independently arranged for the drums and the polygon scanner motor. However, these oscillators can be realized by a single oscillator. The fifth embodiment adopting such an arrangement will be described below.

Figure 14:
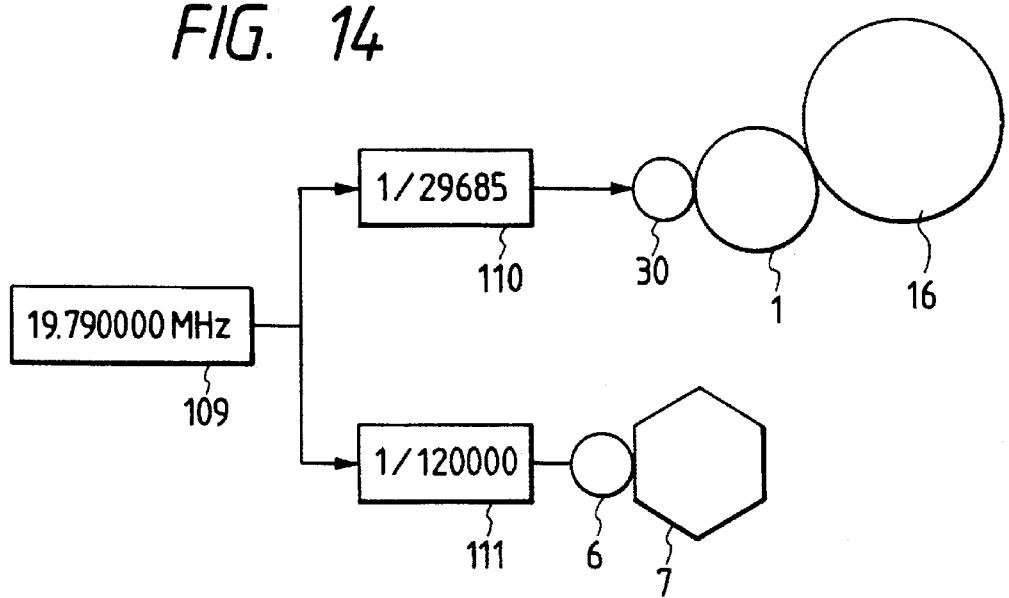
FIG. 14 is a diagram showing an arrangement of principal part according to the fifth embodiment of the present invention.

FIG. 14 shows the fifth embodiment. This embodiment comprises a single oscillator for supplying a reference signal. The same reference numerals in this embodiment denote the same parts as in the fourth embodiment. A common oscillator 109 supplies a reference signal using a quartz vibrator. A frequency divider 110 frequency-divides a 19.790000-MHz signal to 1/29,685, and supplies a 666.666667-Hz signal to a stepping motor 30, which is rotated at 200 steps per revolution. A frequency divider 111 frequency-divides the 19.790000-MHz signal from the oscillator 109 to 1/20,000, and supplies a 164.9166667-Hz signal to a scanner motor. In this embodiment, the scanner motor is rotated at 9,895 rpm. Since the period per revolution of the scanner motor is 6.063668 msec, and the polygon mirror has six mirror surfaces, a period per laser scan is 1.010611 msec. When the outer circumferential surface of the transfer drum is scanned at this period, lines can be drawn at a pitch of 63.4986 μm (=120×τ÷6×1.010611×10⁻³). This pitch corresponds to 400.00881 dpi (=25.4 mm÷63.4986 μm).

In the above embodiment, the rotation period of the transfer drum can be an integer multiple of the scan period of the scanner motor, and color images can be accurately formed to overlap each other.

The reference frequency for rotation control of the motor in the above embodiments is variously changed in correspondence with a change in diameter of the photosensitive drum or a gear ratio of a reduction gear system including gears for rotating the photosensitive drum. Thus, color images, which are formed in the first to fourth processes to constitute a color image formed on the transfer drum, can be formed at the same position with high precision.

In each of the first to fifth embodiments, an electrophotographic color printer has been exemplified. In addition to the electrophotography system, the present invention may be applied to a photograph system for directly forming a latent image on a photosensitive film. The first to fifth embodiments can be arbitrarily combined.

Sixth Embodiment

In the fourth and fifth embodiments, the rotation period of the transfer drum is set to be an integer multiple of the laser scan period by the scanner motor. In this embodiment, the relationship among the circumferential length of the transfer drum, the subscan line density, and the number of reflection surfaces of a polygon mirror is determined to satisfy the following equation:

Circumferential Length of Transfer Drum =(Number of Surfaces of Polygon Mirror/Subscan Line Density)×Integer or Period of Transfer Drum =(Number of Surfaces of Polygon Mirror×Main Scan Period)×Integer When this relationship is satisfied, one mirror surface of the polygon mirror can coincide with the first main scan operations of yellow, magenta, cyan, and black images. More specifically, for scan lines on which color components overlap each other, image formation can be performed by a laser beam reflected by the same surface of the polygon mirror. Thus, color misregistration caused by errors in units of surfaces of the polygon mirror can be prevented, and a high-quality image can be obtained. When the above-mentioned relationship is satisfied, since the rotation period of the transfer drum is set to be an integer multiple of the laser scan period by the scanner motor like in the fourth and fifth embodiments, the effects of the fourth and fifth embodiments can also be provided.

A description of the circuit arrangement of this embodiment will be omitted since the oscillation frequencies and the frequency division ratios in the fourth or fifth embodiment can be appropriately determined.

This embodiment is particularly effective for an apparatus, which cannot obtain sufficient machining precision of mirror surfaces, such as an optical apparatus in which a polygon mirror has an f-θ characteristic, as described in detail in U.S. Pat. No. 4,853,710.

As a detailed circumferential length, when the subscan density is set to be 12 lines per mm, the number of mirror surfaces of the polygon mirror is 6, and the image formation length for an A4 size is 297 mm, the circumferential length is 297 mm+α (α represents a preparation period for the next image formation). The circumferential length is calculated using the above equation (integer: 188) as follows:

Transfer Drum Circumferential Length L =12/6×188=376

Upon selection of the transfer drum circumferential length of 376 mm, write start main scan operations of color images can be attained using the same mirror surface. Therefore, a trouble such as jitter can be eliminated.

Seventh Embodiment

Figure 15:
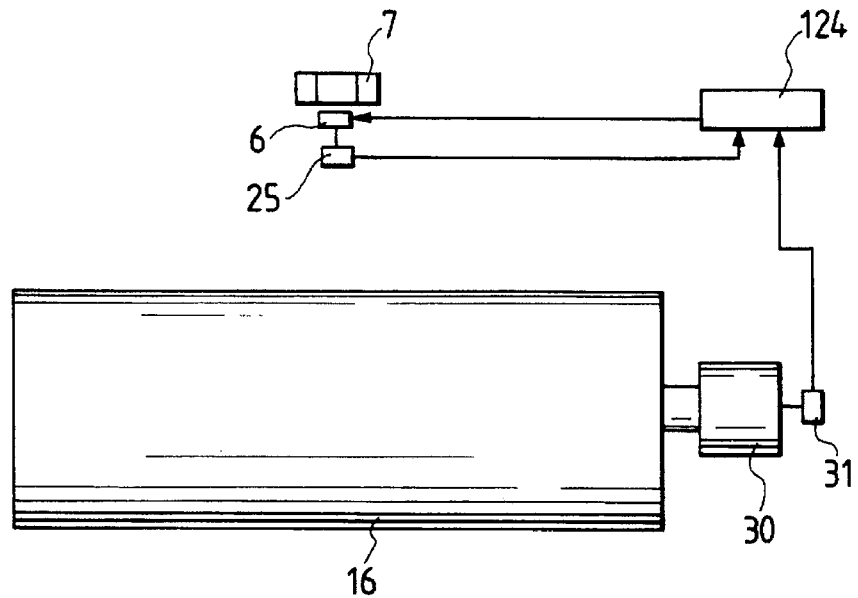
FIG. 15 is a diagram showing an arrangement of principal part according to the seventh embodiment of the present invention.

FIG. 15 is a diagram showing principal part of the seventh embodiment. Encoders 25 and 31 are respectively attached to a motor 30 for rotating a transfer drum 16, and a motor 6 for rotating a polygon mirror, which are shown in FIG. 1. The rotational speeds of these motors are detected by the encoders 25 and 31, and detection signals are monitored by a comparator 124, thereby controlling the motor 30 for the transfer drum 16. In place of controlling the motor for the transfer drum, the motor 6 for rotating the polygon mirror 7 may be controlled. Alternatively, control may be made, so that the respective colors have the same image start positions.

Since this control method can be easily realized by applying the first or second embodiment, a detailed description thereof will be omitted.

Eighth Embodiment

Figure 16:
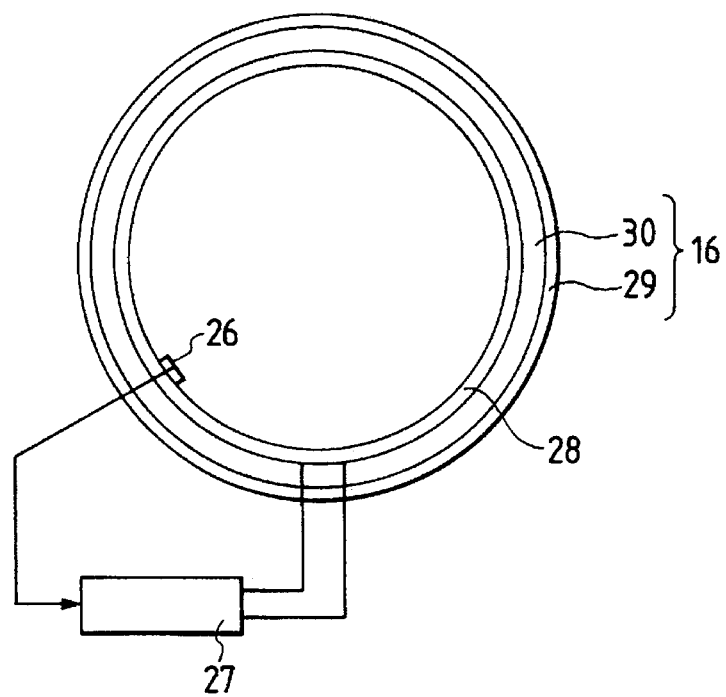
FIG. 16 is a diagram showing an arrangement of principal part according to the eighth embodiment of the present invention.

FIG. 16 shows the eighth embodiment of the present invention.

It is well known that a material expands when its temperature is increased.

In the apparatus shown in FIG. 1, ambient temperature normally falls within the range of 5° C. to 35° C. Upon operation of the apparatus, the temperature of the transfer drum 16 is increased, and the transfer drum 16 is contracted. As a result, in the apparatus shown in FIG. 1, it is often impossible to constantly register color images. In FIG. 16, the transfer drum 16 incorporates a heater 28, and the temperature of the transfer drum 16 is detected by a thermistor 26. The detection signal from the thermistor 26 is used for controlling a power supply 27 of the heater 28.

Thus, it was found that when a constant temperature within a range between 40° C. and 60° C. was set, the above-mentioned drawbacks were eliminated.

Modification

The present invention can be practiced as follows although not illustrated. More specifically, in the embodiment shown in FIG. 1, definition is made for the transfer drum. In an apparatus described in detail in Japanese Laid-Open Patent Application No. 60-76766, when an image carrier, i.e., an image forming body having a photoconductive photosensitive surface is moved a plurality of times to form overlapping images using the same exposure device, definition may be made for the image carrier. When this modification was combined with the eighth embodiment, it was demonstrated as another effect that humidity absorption of a photosensitive layer could be prevented to stabilize an image. In an apparatus main body, which can switch a resolution (dot density), e.g., an apparatus which can select one of subscan densities of 240 dots/inch, 300 dots/inch, 400 dots/inch, 600 dots/inch, and higher dots/inch, the most frequently used resolution can be determined in correspondence with the circumferential length of the transfer drum or the image carrier. In FIG. 1, a shift of dots is preferably maintained within 30% in both the main scan and subscan directions, and more preferably, within 20%.

In the above description, an apparatus using developing agents of four colors has been exemplified. The same effect can also be expected in an apparatus using developing devices of two or more colors. It was found that when an image was formed using developing agents of four colors, color misregistration could be reduced by overlapping two or more colors.

In the above description, an image carrier drum or a transfer drum has been exemplified. However, the present invention is applicable to an image carrier constituted by a sheet film or a transfer sheet in addition to these drums.

An image is transferred by feeding a recording sheet P several times onto the transfer drum. However, in an apparatus wherein images are directly transferred onto the transfer drum a plurality of number of times, and the images on the transfer drum are simultaneously transferred onto a recording sheet P, the circumferential length of the transfer drum can be determined to be a predetermined value.

The present invention can be variously modified within the scope of appended claims. For example, the first to eighth embodiments described above can be arbitrarily combined, and such combinations do not depart from the scope of the invention.

What is claimed is:

1. An image forming apparatus which forms a plurality of overlapping images, comprising:

scan means for scanning a light beam modulated based on an image signal in a main scan direction;

drive means for continuously rotating an image carrier in a subscan direction of an image for a plurality of rotations; and forming means for forming a predetermined number of images on said image carrier to overlap each other during the plurality of rotations, wherein a period for one revolution of said image carrier is set substantially to an integer multiple of a scan period for one main scanning of the light beam by said scan means so that the predetermined number of images faithfully compose a single image.

2. An apparatus according to claim 1, wherein said apparatus comprises a color image forming apparatus for forming images in units of color components on said image carrier to overlap each other.

3. An apparatus according to claim 1, wherein said scan means includes a polygon mirror.

4. An apparatus according to claim 3, wherein the rotation period of said image carrier is approximately given by (the scan period in the main scan direction of the light beam by said scan means)×(the number of surfaces of said polygon mirror)×(integer).

5. An apparatus according to claim 1, further comprising a photosensitive drum exposed with the light beam scanned by said scan means, and developing means for visualizing a latent image formed on said photosensitive drum, wherein the visualized image formed on said photosensitive drum is transferred onto said image carrier.

6. An apparatus according to claim 5, wherein said image carrier comprises one of a transfer belt and a transfer drum.

7. An apparatus according to claim 1, wherein said image carrier includes a photosensitive drum, and wherein said apparatus includes developing means for visualizing a latent image on said photosensitive drum using developing agents of a plurality of colors, latent images being sequentially formed on said photosensitive drum using the light beam, and color visible images being formed using developing agents of different colors to overlap each other.

8. An apparatus according to claim 1, wherein each of said scan means and said drive means comprises oscillation means for outputting a predetermined frequency signal, and frequency division means for frequency-dividing the predetermined frequency signal, a scan speed of the light beam, and a rotational speed of said image carrier being controlled based on a signal from said frequency division means.

9. An apparatus according to claim 8, wherein said oscillation means of said scan means is common to said oscillation means of said drive means.

10. An apparatus according to claim 1, further comprising means for controlling a temperature of said image carrier.

11. An image forming method for forming a plurality of overlapping images in an image forming apparatus in which a plurality of images are formed on an image carrier to overlap each other while the image carrier is continuously rotated in the same direction for plural rotations, said image forming apparatus comprising scan means for scanning a light beam modulated based on an image signal in a main scan direction and image forming means for forming an image on the image carrier, said method comprising the steps of:

detecting the light beam scanned by said scan means at a predetermined position;

detecting a predetermined rotational position of said image carrier; and controlling at least one rotation of said scan means and the rotation of said image carrier on the basis of an output timing of a first detection signal from said light beam detection step and an output timing of a second detection signal from said image carrier detection step, wherein in said image forming apparatus, a period for one revolution of said image carrier is set substantially to an integer multiple of a scan period for one main scanning of the light beam by said scan means.

12. A method according to claim 11, wherein each of the plurality of the images has different color components than each other.

13. A method according to claim 11, wherein said means comprises a polygon mirror.

14. A method according to claim 13, wherein the period for one revolution of said image carrier is approximately given by (the scan period in the main scan direction of the light beam in said scanning step)×(the number of surfaces of said polygon mirror)×(integer).

15. A method according to claim 11, wherein said image forming means comprises a photosensitive drum exposed by said light beam, means for visualizing a latent image formed on said photosensitive drum, and means for transferring the visualized image formed on said photosensitive drum onto said image carrier.

16. A method according to claim 15, wherein said image carrier comprises one of a transfer belt and a transfer drum.

17. A method according to claim 11, wherein said image carrier includes a photosensitive drum and said image forming means comprises means for visualizing a latent image on said photosensitive drum using developing agents of a plurality of colors, and wherein latent images are sequentially formed on said photosensitive drum using the light beam, and color visible images are formed using developing agents of different colors to overlap each other.

18. A method according to claim 11, wherein each of said scanning step and said rotating step comprises the steps of outputting a predetermined frequency signal, and frequency dividing the predetermined frequency signal, a scan speed of the light beam and a rotational speed of said image carrier being controlled based on a signal from said frequency dividing step.

19. A method according to claim 18, wherein said outputting step of said scanning step is common to said outputting step of said rotating step.

20. A method according to claim 11, further comprising the step of controlling a temperature of said image carrier.

21. A color image forming apparatus which forms a color image composed of a plurality of color component images, comprising:

scan means for scanning a light beam modulated based on an image signal in a main scan direction;

drive means for continuously rotating an image carrier in a subscan direction of an image for a plurality of rotations; and forming means for forming a predetermined number of color component images on a recording medium to overlap each other during the plurality of rotations, wherein a period for one revolution of said image carrier is set substantially to an integer multiple of a scan period for one main scanning of the light beam by said scan means so that the predetermined number of color component images faithfully compose a color image.

22. An apparatus according to claim 21, wherein the color image is composed of yellow, magenta, cyan and black images.

23. A color image forming method for forming a color image composed of a plurality of color component images in an image forming apparatus in which a plurality of color component images are formed on a recording medium to overlap each other while the image carrier is continuously rotated in the same direction for plural rotations, said image forming apparatus comprising scan means for scanning a light beam modulated based on an image signal in a main scan direction and image forming means for forming an image on the recording medium, said method comprising the steps of:

detecting the light beam scanned by said scan means at a predetermined position;

detecting a predetermined rotational position of said image carrier; and controlling at least one rotation of said scan means and the rotation of said image carrier on the basis of an output timing of a first detection signal from said light beam detection step and an output timing of a second detection signal from said image carrier detection step, wherein in said image forming apparatus, a period for one revolution of said image carrier is set substantially to an integer multiple of a scan period for one main scanning of the light beam by said scan means.

24. A method according to claim 23, wherein the color image is composed of yellow, magenta, cyan and black images.

* * * * *

UNITED STATES PATENT AND TRADEMARK OFFICE
CERTIFICATE OF CORRECTION

PATENT NO. : 5,638,191

DATED : June 10, 1997

INVENTOR(S) : Akira Torisawa, et al.

It is certified that error appears in the above-identified patent and that said Letters Patent is hereby corrected as shown below:

On the cover page, under References Cited, change "4,803,867" to --"4,803,367--.

Column 3, line 34, change "(=120xτ÷(25.4÷400))" to --(=120xπ+(25.4÷400))--.

Column 6, line 57, change "AVCO" to --A VCO--.

Column 8, line 6, change "120xτ" to --(120xπ--; and
line 30, change "(=120xτ÷6x" to --(=120xπ+6x--.

Column 9, line 2, change "(=120xτ÷6x" to --(= 120xπ+6x--.

Signed and Sealed this

Twenty-sixth Day of May, 1998

Attest:

BRUCE LEHMAN

*Attesting Officer*      Commissioner of Patents and Trademarks